(12) United States Patent
Froude et al.

(10) Patent No.: US 6,347,806 B1
(45) Date of Patent: Feb. 19, 2002

(54) SNAP-ON THERMOPLASTIC AIR BAG COVER WITH ENHANCED MOLDABILITY

(75) Inventors: Michael G. Froude, Fraser; Darius J. Preisler, Macomb, both of MI (US)

(73) Assignee: Patent Holding Company, Fraser, MI (US)

( * ) Notice: Subject to any disclaimer, the term of this patent is extended or adjusted under 35 U.S.C. 154(b) by 0 days.

(21) Appl. No.: 09/489,535

(22) Filed: Jan. 21, 2000

(51) Int. Cl.[7] .............................................. B60R 21/16
(52) U.S. Cl. ..................................... 280/728.2; 280/731
(58) Field of Search ........................... 280/728.2, 728.3, 280/731

(56) References Cited

U.S. PATENT DOCUMENTS

| | | |
|---|---|---|
| 3,539,200 A | 11/1970 | Chute |
| 5,062,661 A | 11/1991 | Winget |
| 5,064,217 A | 11/1991 | Shiraki |
| 5,280,946 A | 1/1994 | Adams et al. |
| 5,314,203 A | 5/1994 | Adams et al. |
| 5,338,060 A | 8/1994 | Soderquist |
| 5,342,086 A | 8/1994 | Harris et al. |
| 5,369,232 A | 11/1994 | Leonelli |
| 5,465,998 A | 11/1995 | Davis |
| 5,487,557 A | 1/1996 | Eckhout |
| 5,498,026 A | 3/1996 | Eckhout |
| 5,501,485 A | 3/1996 | Eckhout |
| 5,520,412 A | 5/1996 | Davis |
| 5,524,922 A * | 6/1996 | Soderquist ............... 280/728.3 |
| 5,542,694 A | 8/1996 | Davis |
| 5,549,323 A | 8/1996 | Davis |
| 5,558,364 A | 9/1996 | Davis |
| 5,577,766 A * | 11/1996 | Niwa et al. .................. 280/731 |
| 5,603,968 A | 2/1997 | Tajiri et al. |
| 5,630,612 A * | 5/1997 | Yamamoto et al. ...... 280/728.2 |
| 5,630,617 A | 5/1997 | Hashiba |
| 5,683,101 A | 11/1997 | Davis et al. |
| 5,686,490 A | 11/1997 | Okazaki et al. |
| 5,775,728 A | 7/1998 | Niwa et al. |
| 5,794,968 A | 8/1998 | Yamamoto et al. |
| 5,922,368 A | 7/1999 | Murphy |
| 5,971,430 A * | 10/1999 | Niwa et al. .................. 280/731 |
| 6,007,088 A * | 12/1999 | Yamamoto et al. ...... 280/728.3 |
| 6,199,908 B1 * | 3/2001 | Isomura et al. ............. 280/777 |

* cited by examiner

Primary Examiner—Paul N. Dickson
Assistant Examiner—Faye M. Fleming
(74) Attorney, Agent, or Firm—Brooks & Kushman P.C.

(57) ABSTRACT

A snap-on air bag cover having enhanced moldability is provided for use with an air bag container assembly including a container having a retaining member and a retaining bracket secured to the container to move therewith. The snap-on air bag cover includes a plastic front panel adapted to overlie an uninflated air bag contained within the container, a plurality of plastic side walls connected to an inner surface of the front panel and resilient locking blocks connected to and extending inwardly from the side walls. Each locking block has an extending snap-on groove defined therein at a surface of the locking block facing the inner surface of the front panel. The locking blocks are adapted to cooperate with the retaining member for affixing the air bag cover to the air bag container. The resilient locking blocks travel away from each other in opposite directions allowing the retaining member to enter and abuttingly engage the snap-on groove thereby retaining the air bag cover on the air bag container. Rearwardly facing surfaces of a pair of locking blocks prevent movement of the retaining bracket and the retaining member toward the inner surface of the front panel thereby eliminating the need for a rear beak or shoulder portion of the locking blocks which would complicate the moldability of the cover.

9 Claims, 2 Drawing Sheets

SNAP-ON THERMOPLASTIC AIR BAG COVER WITH ENHANCED MOLDABILITY

CROSS-REFERENCE TO RELATED APPLICATION

This application is related to U.S. patent application entitled "Thermoplastic Air Bag Cover Mountable Onto An Air Bag Container Assembly" filed on the same date as this application and having the same assignee as this application. This application is hereby incorporated in its entirety by reference herein.

1. Technical Field

This invention relates to a snap-on thermoplastic air bag covers.

2. Background Art

Thermoplastic air bag covers are widely used. Examples of such air bag covers can be found in the following U.S. Pat. Nos. 3,539,200; 5,062,661; 5,487,557; 5,465,998; 5,549,323; 5,558,364; 5,498,026; 5,520,412; 5,542,694; 5,501,485; and 5,683,101. Snap-on air bag covers are shown in the following U.S. patent numbers. from the above list: U.S. Pat. Nos. 3,539,200; 5,465,998; 5,498,026; 5,501,485; and 5,683,101.

Injection molding apparatus for forming such air bag covers typically have a first mold half having a first molding surface to form a first part of an air bag cover-defining cavity and a second mold half having a second molding surface to form a second complementary part of the air bag cover-defining cavity. The first and second molding surfaces form the air bag cover including a front cover panel and separate resilient clip members integrally formed with the front cover panel. Each of the clip members typically has a front engagement section, a rear shoulder section, and a snap-on groove extending therebetween for snapping the air bag cover onto a retaining member of an air bag assembly.

Typically, the mold parts which form the resilient clip members of the air bag cover are formed to facilitate removal of the air bag cover upon completion of a molding cycle. An operator grabs the molded air bag cover and snaps it off the mold parts forming the clip members. Such manual removal of the air bag cover from the injection molding apparatus is undesirable for many reasons.

Other plastic air bag covers are disclosed in the following U.S. Pat. Nos.: 5,064,217; 5,686,490; 5,280,946; 5,314,203; 5,338,060; 5,342,086; 5,369,232; 5,577,766; 5,630,617; 5,775,728; and 5,794,968.

U.S. Pat. No. 5,603,968 discloses molding apparatus for snap-on air bag covers including a plurality of core members which are movable between retracted and extended positions with respect to one of the movable and fixed mold halves. The core members define a molding cavity along with the movable and fixed mold halves when the core members are in their retracted position.

U.S. Pat. No. 5,922,368 discloses a robust injection molding apparatus for molding snap-on thermoplastic air bag covers on a production basis. The injection molding apparatus includes a plurality of outboard mold parts for molding thermoplastic air bag covers wherein each outboard mold part forms a clip member of the air bag cover including its front and rear sections and snap-on groove therebetween.

However, the molding apparatus disclosed in the prior art is still relatively complicated to make snap-on covers on a consistent basis.

DISCLOSURE OF INVENTION

An object of the present invention is to provide a snap-on thermoplastic air bag cover with enhanced moldability wherein the air bag cover is easy to mold and does not require extensive part fill out.

Another object of the present invention is to provide a snap-on thermoplastic air bag cover with enhanced moldability wherein the air bag cover is relatively easy and inexpensive to mold and still provides a snap-on feature.

In carrying out the above objects and other objects of the present invention, a snap-on thermoplastic air bag cover with enhanced moldability is provided. The air bag cover is mountable onto an air bag container assembly including a container having a retaining member and a retaining bracket secured to the container to move therewith. The cover includes a front panel having inner and outer surfaces and adapted to overlie an uninflated air bag contained within the container. The cover also includes a plurality of side walls connected to and extending rearwardly from the inner surface of the front panel. The cover further includes a locking block connected to and extending inwardly from each of the side walls. Each locking block has an extending snap-on groove in a first surface of the locking block facing the inner surface of the front panel. The locking blocks are adapted to cooperate with the retaining member for affixing the air bag cover to the air bag container. Each locking block is characterized in cross-section as having a resilient beak portion for contacting the retaining member during mounting onto the container. The snap-on grooves facilitate resilient displacement of the beak portions. A rearwardly facing surface of at least one of the locking blocks prevents movement of the retaining bracket and the retaining member toward the inner surface of the front panel during mounting of the air bag cover on the container to secure the retaining member within the snap-on groove.

Preferably, the at least one of the locking blocks has a first groove defined in the rearwardly facing surface. In this way, the at least one locking block is adapted to receive and retain the retaining bracket within the first groove.

The cover is preferably molded from a resilient thermoplastic material such as a thermoplastic rubber.

The advantages accruing to an air bag cover as described above are numerous. For example, the resulting air bag cover is easy to mold and does not require extensive part fill out. Also, the air bag cover is relatively easy and inexpensive to mold and still provides the desirable snap-on feature.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
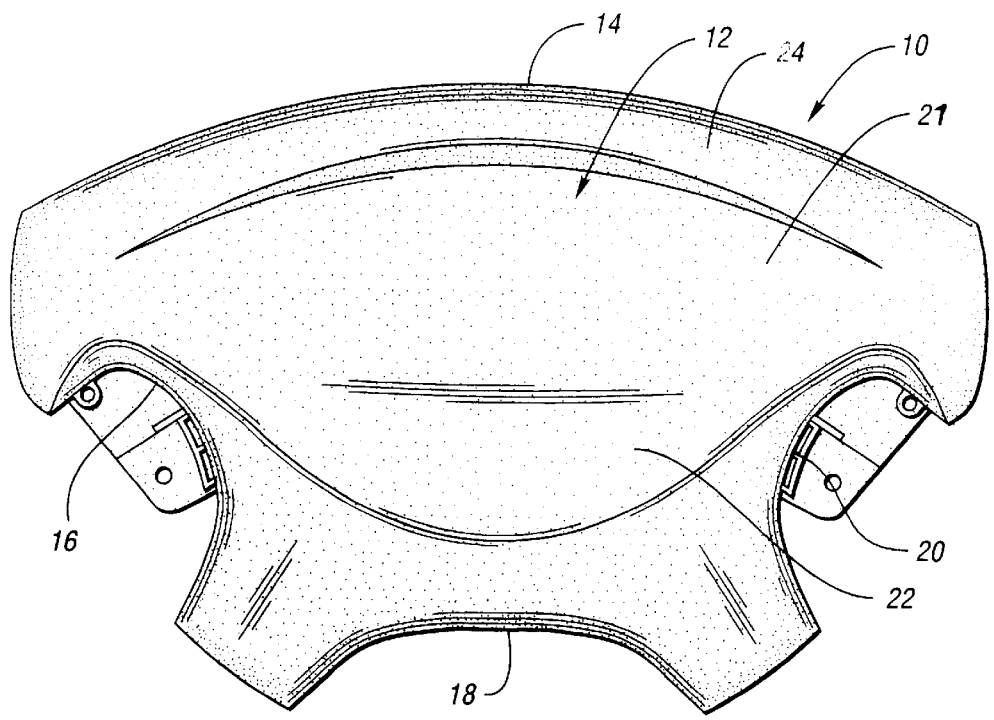
FIG. 1 is a front elevational view of an air bag cover constructed in accordance with the present invention.
Figure 2:
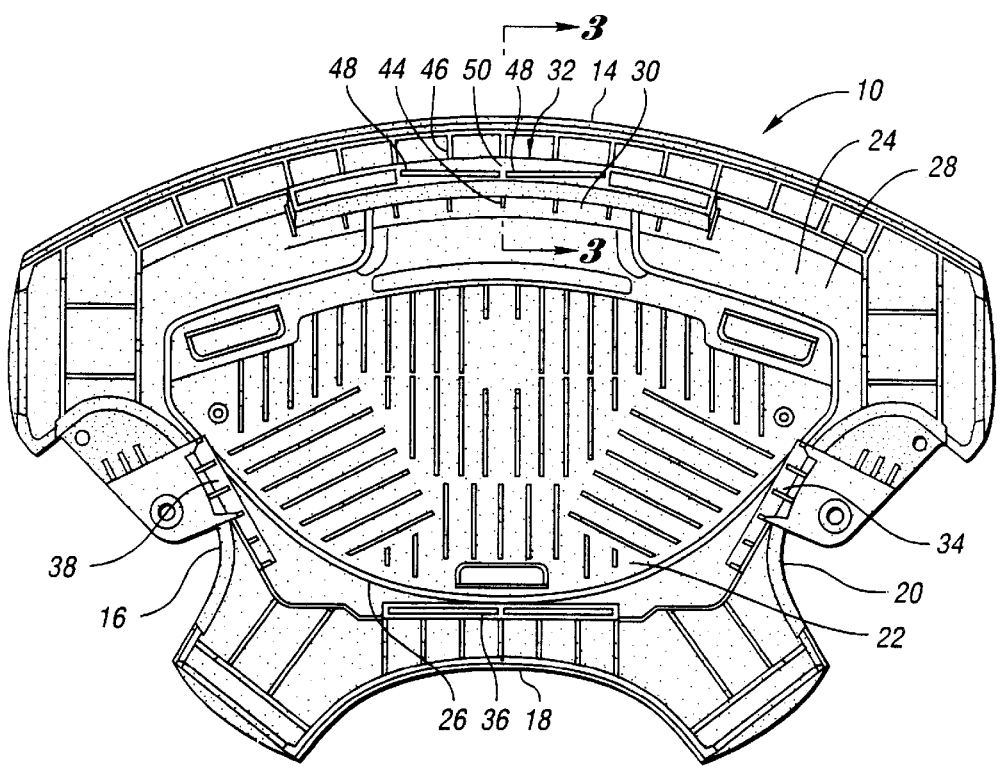
FIG. 2 is a rear elevational view of the air bag cover.

Referring now to the drawing Figures, there is illustrated in FIGS. 1 and 2 an embodiment of an automotive air bag cover, generally indicated at 10, constructed in accordance with the present invention. Typically, the automotive air bag cover 10 is secured at the top end of a vehicle drive column (not shown) at the steering wheel of the vehicle.

A front panel, generally indicated at 12, of the air bag cover 10, is integrally formed with side panels 14, 16, 18 and 20. An outer surface 21 of the front panel 12 is disposed to face a vehicle operator (not shown).

The front and side panels 12, 14, 16, 18 and 20 are adapted to enclose an uninflated automotive air bag (not shown) between the cover 10 and the steering column (not shown).

The front panel 12 includes upper and lower portions 24 and 22, respectively. The upper and lower portions 24 and 22 are interconnected to the side panels 14–20 and to each other at a break seam 26 shown in FIG. 2. The break seam 26 is of reduced thickness to permit the air bag, as it is inflating, to exert a force at the lower portion 22 of the front panel 12 at an inner surface 28 of the front panel 12 to cause the lower portion 22 of the front panel 12 to separate from the side panels 14–20 and the upper portion 24 along the break seam 26.

The lower portion 22 of the front panel 12 is hingedly connected to the top portion 24 at a hinge 30, as best shown in FIG. 2. After separation from the side panels 16–20, the lower portion 22 of the front panel 12 can swing upwardly and downwardly, respectively, and out of the way of the inflating air bag.

Referring now to FIG. 2, there is shown four locations 32, 34, 36 and 38 at which an air bag container (not shown) having a retaining member is affixed with the air bag cover 10. Since the structure for mounting the cover 10 at each of locations 32, 34, 36 and 38 are substantially identical in cross-section, only the structure at location 32 is now described with reference to FIG. 3.

Figure 3:
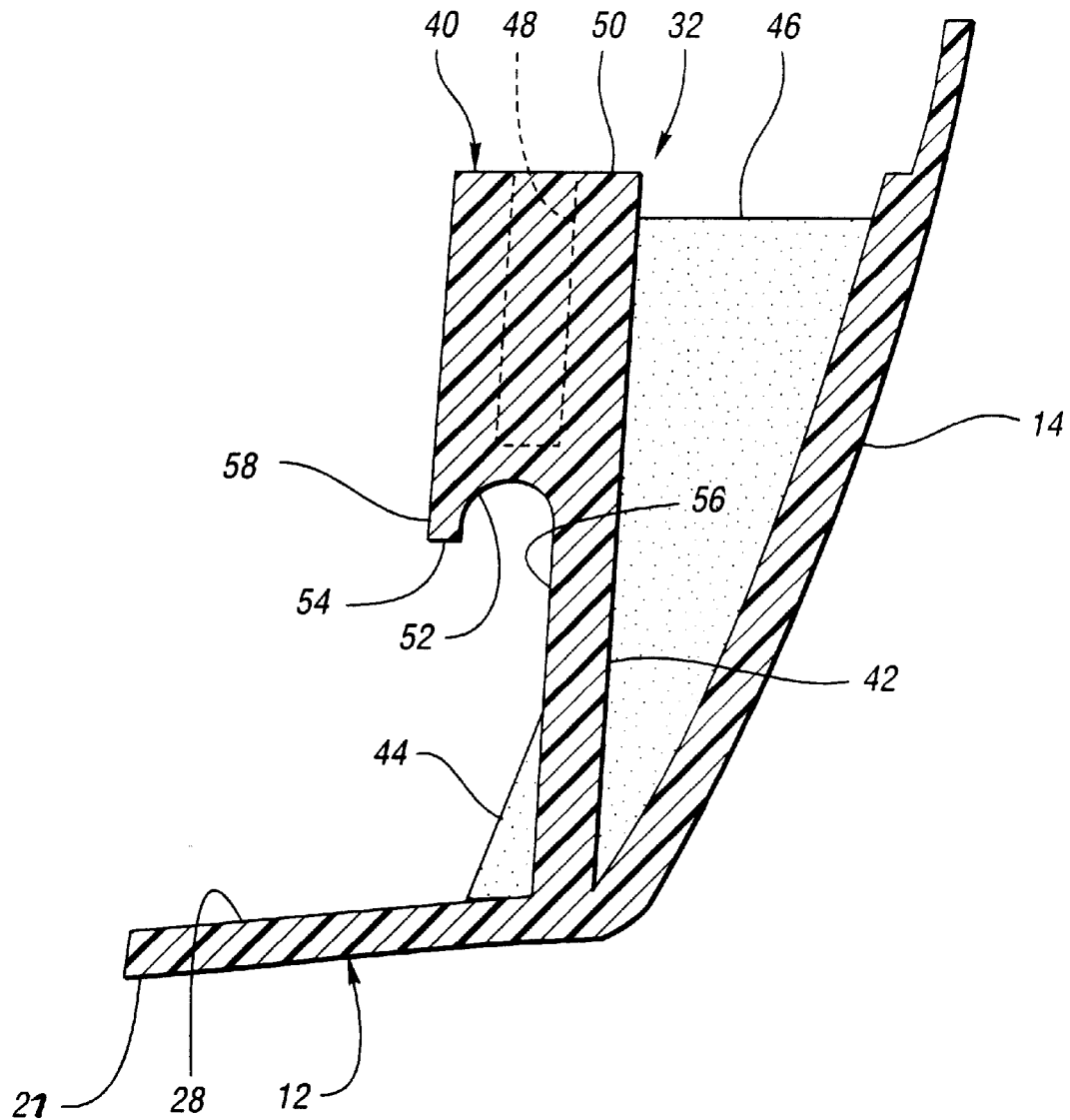
FIG. 3 is a view, partially broken away and in cross-section, of the air bag cover taken along lines 3—3 of FIG. 2.

Referring now to FIG. 3, there is shown a resilient side locking block, generally indicated at 40. The locking block 40 is connected to and extends inwardly from a side wall 42 having a relatively uniform thickness. The side wall 42, in turn, is connected to and extends rearwardly from the inner surface 28 of the front panel 12. The side wall 42 is supported within the cover 10 by integrally-formed, triangular-shaped ribs 44 and 46. The ribs 44 extend between the inner surface 28 of the front panel 12 and the wall 42 and the ribs 46 extend between the side panel 14 and the wall 42.

As best shown in FIG. 3, retaining grooves or slots 48 are formed in a rearwardly facing surface 50 for receiving and retaining therein bent flanges of a metal retaining bracket (not shown) of the air bag container assembly. The retaining bracket is secured to the air bag container to move therewith so that when the retaining bracket engages the rearwardly facing surface 50 of the locking block 40 movement of retaining bracket and the retaining member of the container toward the front panel 12 is stopped.

A snap-on groove 52 is shown disposed within the locking block 40 at a surface 54 which faces the inner surface 28 of the front panel 12 immediately adjacent an inner surface 56 of the side wall 42. The snap-on groove 52 is disposed between a beak portion 58 of the locking block 40 and the inner surface 56 of the side wall 42 immediately adjacent the snap-on groove 52.

The snap-on groove 52 is configured to cooperate with the retaining member or rim of an air bag container. For proper connection and retainment, the snap-on groove 52 should have a cross-sectional shape that corresponds to the shape of the air bag container rim. As previously mentioned, engagement of the retaining bracket with the rearwardly facing surface 50 of the locking block 40 prevents movement of the retaining member toward the inner surface 28 of the front panel 12 during mounting on the container. Because of this, the locking block 40 does not need a rear beak or shoulder portion which would complicate the moldability of the cover 10.

It is preferred that the air bag cover of the present invention be manufactured from a flexible thermoplastic rubber such as commercially available "Santoprene® 201-87" provided by Advance Elastomers Systems of Auburn Hills, Mich. Santoprene® is a registered trademark of the Monsanto Company. Santoprene® 201-87 is a colorable thermoplastic general purpose elastomer with good fluid resistance which is processable by injection molding and extrusion.

The tear strength, ultimate tensile strength, hardness, and elasticity of the material are characteristically important to the choice of the thermoplastic material used to manufacture the air bag. The preferred thermoplastic material used for manufacture of the air bag cover has a tensile strength in a range from 15.0 to 17.0 Mpa's. The preferred material used has a tear strength in a range from 47 to 51 kN/M at 25° C. and 21 to 25 kN/M at 100° C. The preferred material used has a durometer hardness in a range of 70 to 100 on the Shore A scale. The above characteristics in conjunction with the structure of the air bag cover satisfy the necessary conditions related to the inflation and exit of the air bag from the cover.

The particular thermoplastic rubber described above assists in providing the operative resilient characteristics needed to provide an air bag cover 10 which is directly affixable to an air bag container. The air bag cover 10 of the present invention is resilient enough to accept deformation of the side walls 42 and locking blocks 40 while the air bag cover 10 is connected to the air bag container on the steering column (not shown) throughout the operative life of the associated vehicle. The cover 10 is relatively easy to mold and does not require extensive part fill out. There is no need to provide a rear beak or shoulder portion on any of the locking blocks 40 to prevent movement of the container toward the front panel 12 as required by the prior art. Thus, the tear strength, ultimate tensile strength, hardness, and elasticity of the thermoplastic rubber material, as described above are important to the overall operation of the air bag cover 10.

The air bag cover 10 of the present invention is preferably injection molded using conventional injection molding techniques.

While the best mode for carrying out the invention has been described in detail, those familiar with the art to which this invention relates will recognize various alternative designs and embodiments for practicing the invention as defined by the following claims.

What is claimed is:

1. A snap-on thermoplastic air bag cover mountable onto an air bag container assembly including a container having a retaining member and a retaining bracket secured to the container to move therewith, the cover comprising:

a front panel having inner and outer surfaces and adapted to overlie an uninflated air bag contained within the container;

a plurality of side walls connected to and extending rearwardly from the inner surface of the front panel; and a locking block connected to and extending inwardly from each of the side walls, each locking block having an extending snap-on groove defined in a first surface of the locking block facing the inner surface of the front panel, the locking blocks being adapted to cooperate with the retaining member for affixing the air bag cover to the air bag container, each locking block characterized in cross-section as having a resilient beak portion for contacting the retaining member during mounting onto the container, the snap-on grooves facilitating resilient displacement of the beak portions and wherein a rearwardly facing surface of at least one of the locking blocks prevents movement of the retaining bracket and the retaining member toward the inner surface of the front panel during mounting of the air bag container on the container to secure the retaining member within the snap-on groove.

2. The cover as claimed in claim 1 wherein the at least one of the locking blocks has a first groove defined in the rearwardly facing surface, the at least one locking block being adapted to receive and retain the retaining bracket within the first groove.

3. The cover as claimed in claim 1 wherein the cover is molded from a resilient thermoplastic material.

4. The cover as claimed in claim 2 wherein the thermoplastic material is a thermoplastic rubber.

5. The cover as claimed in claim 2 comprising four locking blocks, each locking block having a first groove.

6. The cover as claimed in claim 1 further comprising a rib between the locking block and air bag cover sidewall for support.

7. The cover as claimed in claim 1 further comprising a rib connecting the locking block and the inner surface at the front wall.

8. The cover as claimed in claim 1 further comprising a first rib between the locking block and air bag cover side wall and a second rib connecting the locking block and the inner surface at the front wall.

9. A snap-on thermoplastic air bag cover mountable onto an air bag container assembly including a container having a retaining member and a retaining bracket secured to the container to move therewith, the cover comprising:

a front panel having inner and outer surfaces and adapted to overlie an uninflated air bag contained within the container;

a plurality of side walls connected to and extending rearwardly from the inner surface of the front panel; and a locking block connected to and extending inwardly from at least one of the side walls, each locking block having an extending snap-on groove defined in a first surface of the locking block facing the inner surface of the front panel, the locking blocks being adapted to cooperate with the retaining member for affixing the air bag cover to the air bag container, each locking block characterized in cross-section as having a resilient beak portion for contacting the retaining member during mounting onto the container, the snap-on grooves facilitating resilient displacement of the beak portions and at least one locking block having a second surface of the locking block on the opposite side of the first surface and facing away from the inner surface of the front panel, wherein the combination of the snap-on groove and the second surface prevents relative forward and rearward movement of the air bag container assembly.

* * * * *